Nov. 6, 1951 H. R. GETTYS ET AL 2,574,100
MOUNTING FOR CUTTING TORCHES
Filed Jan. 21, 1948 3 Sheets-Sheet 1

INVENTORS
Harold R. Gettys
BY Russell P. Kissick
Wood, Arey, Herron & Evans
ATTORNEYS Nov. 6, 1951  H. R. GETTYS ET AL  2,574,100
MOUNTING FOR CUTTING TORCHES
Filed Jan. 21, 1948  3 Sheets-Sheet 2
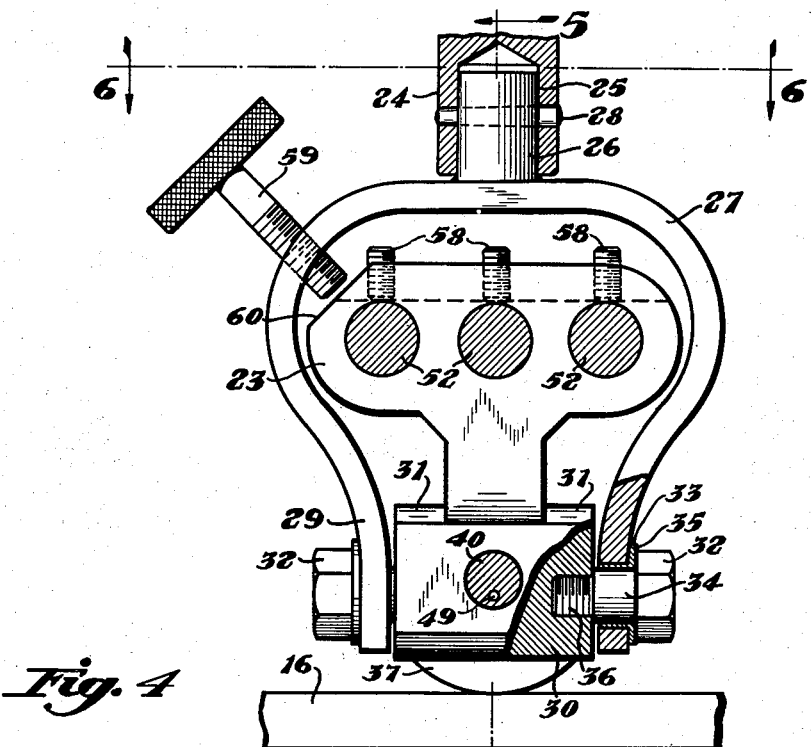
Fig. 4
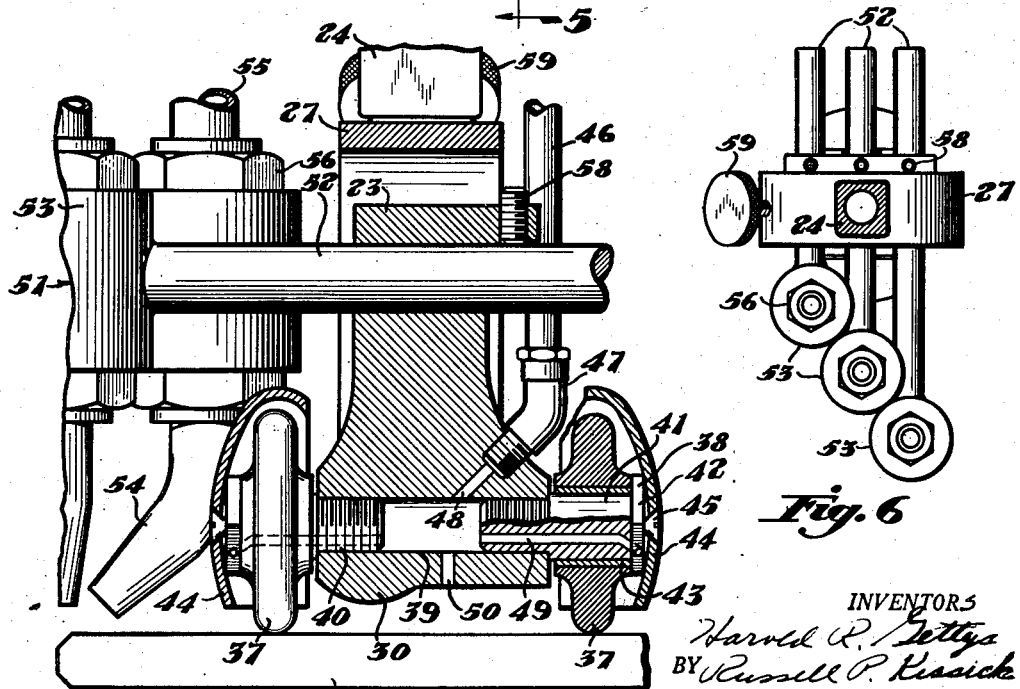
Fig. 5
Fig. 6
INVENTORS
Harold R. Gettys
BY Russell P. Kissick
Wood, Arey, Herron & Evans
ATTORNEYS Nov. 6, 1951  H. R. GETTYS ET AL  2,574,100
MOUNTING FOR CUTTING TORCHES
Filed Jan. 21, 1948  3 Sheets-Sheet 3

INVENTORS
Harold R. Gettys
BY Russell P. Kissick
Wood, Auzy, Herron & Evans
ATTORNEY Patented Nov. 6, 1951

2,574,100

UNITED STATES PATENT OFFICE 2,574,100

MOUNTING FOR CUTTING TORCHES

Harold R. Gettys, North Bend, and Russell P. Kissick, Cincinnati, Ohio, assignors to Stacey Brothers Gas Construction Company, Cincinnati, Ohio, a corporation of Ohio Application January 21, 1948, Serial No. 3,466

6 Claims. (Cl. 266—23)

This invention relates to apparatus for cutting or beveling the edges of metal plates by means of flame cutting torches. More particularly the invention relates to improvements in the unit which supports the cutting torches as they are moved along the edge of the plate being prepared. This type of unit is mounted on an apparatus consisting of a carriage which traverses a table moving along a special track structure. The plate to be processed is disposed on a table along the side of the track. The carriage of the machine includes an adjustable cross slide or platen which is readily adjusted transversely of the edge of the plate being prepared. The unit to which the present improvements are directed is supported at the outer end of this cross slide and the cross slide is set so as to dispose the torches in the proper relation to the plate edge so that they will be fed along the edge through the carriage movement.

It has been customary in the past to provide a mounting for the torch carrying unit which will permit it to float or adjust directly vertically to accommodate for unevenness along the plate edge longitudinally thereof. It is highly desirable that the unit correct not only for longitudinal variation in the plate surface but for variations occurring laterally or transversely relative to the edge. No provision has been made for these later corrections in the past.

Therefore, it has been the object of the present inventor to provide an attachment or unit for supporting cutting nozzles which corrects not only for unevenness of the plate longitudinally but for unevenness laterally as well.

In the use of a cutting nozzle or nozzles attached to a fixed means, the cutting nozzles move along in a plane parallel to the plane of the track upon which the main apparatus is operating. Thus, obviously, the relation of the cutting nozzle will change relative to the plate edge if there are deviations in the position of the plate edge relative to the plane of the track upon which the apparatus is operating. Such changes if occurring longitudinally have been corrected in the past by a vertically floating attachment to the apparatus.

However, where the deviation is across the plate, that is to say, a portion of the plate edge is in a different plane from its laterally adjacent portion, no provision has been made for correction. Such change of relation between the nozzles and the plate edge wherein it is closer or farther from the plate edge will necessarily result in a variation in the edge cuts, whether they be bevel cuts or straight cuts.

Thus in the present improvement the inventor has provided that the element or block carrying the nozzles is free to swivel transversely of the plate edge as such lateral variations occur. In the specific embodiment, this is accomplished by having the block provided with wheels so that it will ride along the plate margin and will swivel or rotate on a pivot as the variations occur.

It has been a still further object of the inventor to provide means for cooling the plate in the area of the wheels and for removing dirt and slag from the plate ahead of the wheels.

When the device is used for cutting very heavy plates and additional heat is required to bring the metal up to cutting temperature, a preheating unit is provided as a part of the present invention. It has been a further object to provide such a preheating attachment which will be free to follow the contour of the metal, both laterally and longitudinally in the same manner as the main cutting unit so that it will accurately heat up the edge as the cutting nozzles follow behind it, and further to provide that this preheating attachment may be conveniently mounted or coupled to the main unit so as to operate in front of it.

It has been a further object to provide a supplemental or auxiliary device of this character which may carry one of the cutting torches in place of a preheating torch. This type of device is extremely useful for cutting thin plates.

It has been a further object to provide that the units carrying the nozzles will be restricted to a normal range of swiveling movement so that when the end of the plate is reached, the units will not become completely displaced from their normal floating position.

On the thinner plates when three nozzles are used and are adjusted very closely to accomplish a double bevel there is excessive heat and the plate melts instead of cutting off smoothly. Since the up-cut is the first cut made (the cuts are made in the order of up-cut, straight-cut and down-cut) it cuts through the most amount of material and requires a larger cutting nozzle. With the thinner plates there is not sufficient metal to dissipate this heat built up when the large nozzle is immediately followed by the straight and down-cut nozzles. By placing this large nozzle in advance of the other two nozzles the heat has a chance to dissipate sufficiently to allow the nozzles to make a clean cut and not melt the edge of the plate.

Other objects and advantages will be more clearly set forth in the specification with references to the accompanying drawings in which:

2,574,100

3

Figure 4 is a sectional view taken on line 4—4, Figure 2 detailing the arrangement whereby the nozzle block is free to swivel as lateral variations occur along the plate margin.

Figure 5 is a sectional view taken on line 5—5, Figure 4 further detailing the construction of the nozzle block whereby it is free to swivel as it tracks along the plate margin, this view illustrating the arrangement for delivering air for cooling the nozzle block and the areas of the plate adjacent the cutting operation.

Figure 6 is a sectional view taken on line 6—6, Figure 4 detailing the mounting of the cutting nozzles in the block.

Figure 1:
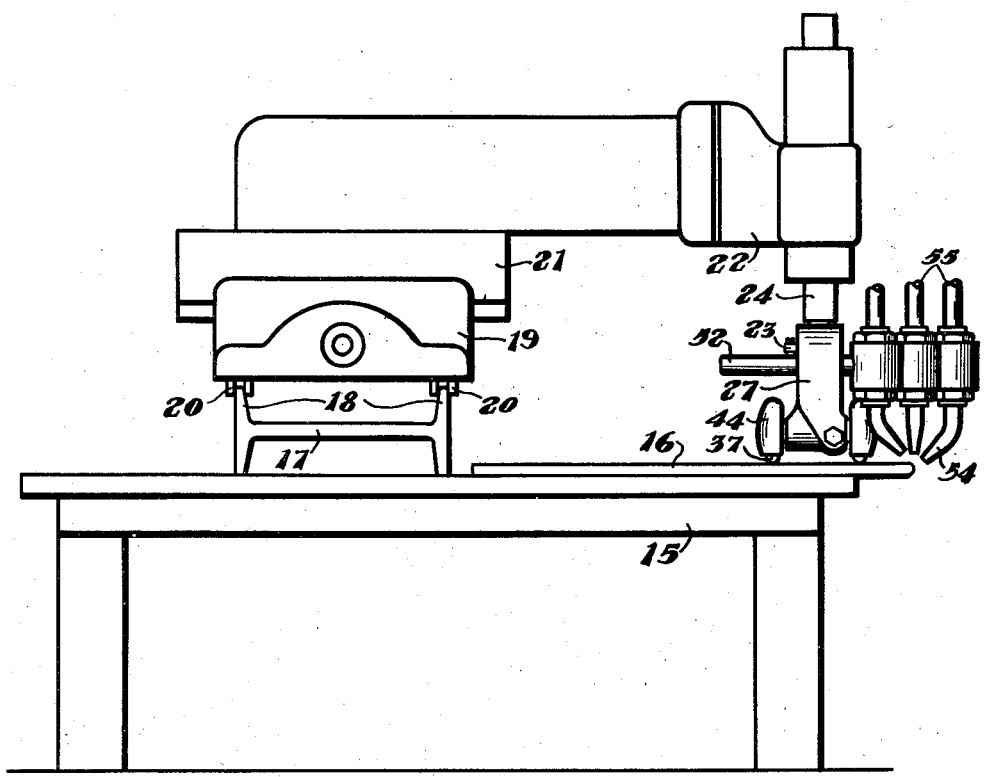
Figure 1 is a general end view showing the feeding mechanism for the improved cutting nozzle including the track and table which supports the apparatus and indicating a plate in position wherein its edge is being prepared by means of the cutting nozzles.

The apparatus which supports the cutting nozzle swivel means of this invention is shown generally in Figure 1. Inasmuch as the invention is entirely concerned with the swivel arrangement for automatic adjustment of the cutting nozzles to variations in the lateral contour of the plate being worked upon, it is not believed necessary to describe the supporting and feeding mechanism in detail. Generally speaking, this conventional apparatus consists of a table 15 adapted to support the plate 16 being worked upon. The table includes a track 17 disposed longitudinally thereof, in this case, consisting of an I-beam lying on its side so that its flanges provide spaced track members 18—18. The carriage for the apparatus is indicated at 19 and includes tracking wheels 20 which ride on the rails 18. This carriage is motor driven along the track. An adjustable cross slide or platen 21 is mounted on the carriage. This cross slide carries a bracket 22 at its outer end, that is, the end disposed over the edge of the plate being worked upon.

The nozzle block 23 of this invention is mounted relative to the bracket 22 so as to be free to move vertically to accommodate for longitudinal variations in the plane of the plate. This arrangement may consist of any arrangement which will permit vertical floating of the cutting nozzle block, in this case, being shown as a mounting stem 24 axially disposed upwardly into the bracket for axial movements as the longitudinal contour of the plate varies. The slidably mounted stem or trunnion 24 includes (Figure 4) a socket 25 within which is mounted or disposed the stem 26 of the swivel attachment element or

4 mount 27 carrying the cutting nozzle block 23. The stem 26 is pinned in position by means of a taper pin 28.

The element 27 is U-shaped, looking toward it from the edge of the plate (Figure 4), and may be described as being in the nature of a loop of metal, the lower ends 29 of which are spaced apart for mounting and supporting the cutting nozzle block.

The cutting block or carriage includes a main body element 30. The body element includes lateral bosses 31—31 into which the pivot screws 32 are axially threaded. The U-shaped element constituting the swivel attachment includes bushings 33 rotatably supporting the intermediate bearing portions 34 of the pivot screws. The heads of the screws engage the flanges 35 of these bushings and the screwthreaded portions 36 of the screws are securely tightened within the bosses of the nozzle block. Thus, the nozzle block may rotate laterally relative to the edge of the plate being prepared.

The body of the cutting nozzle block is supported on a pair of wheels 37 mounted for rotation on an axis at right angles to the pivotal mounting of the nozzle block. These wheels 37 include rounded crowns. They are secured in the cutting nozzle block by means of screws 38, threaded into the opposite ends of a bore 39 in the body element 30. The screws include the screwthreaded portions 40, wheel bearing portions 41 and, the outwardly disposed heads 42. The wheels include bushings 43 surrounding the bearing portions of the mounting screws.

Guards 44 substantially cover or house the wheels. These guard members are fixed in relation to the wheels by means of screws 45 threaded into the wheel mounting screws axially thereof. The purpose of these guards is to protect the wheels and their rotative mountings from the damaging effects of the heat and flame from the cutting torches.

In order to additionally protect these parts against the damaging effects of the heat and to cool the plate as much as possible, an air circulation arrangement is provided. This consists of an air delivery pipe 46 connected to the body 30 by means of a fitting 47. The air is conveyed to the bore 39 through a lateral passage 48 and is delivered endwise through the wheel mounting screws by way of passages 49. These passageways 49 terminate through properly turned ends at the forward sides of the screw heads 42 and thus, the air is delivered ahead of the wheels. Additionally, a bore 50 extends downwardly to the bottom of the body. Thus, the air stream will not only cool the wheels and the plate but will clear any dirt or slag from the path of the wheels assuring that the device will track properly on the plate which is being processed.

The cutting nozzles indicated generally at 51 are mounted in the upper portion of the nozzle block. The mounting studs 52 on the nozzles extend through parallel bores in the cutting nozzle block 23. These mounting studs or stems are disposed parallel with the axis of the wheels upon which the cutting nozzle block is mounted for rolling movement along the plate. Thus, it will be apparent that the nozzles will remain in the same positions relative to the upper surface and the edge of the plate as lateral deflections occur across the margin of the plate. This result is best illustrated in Figures 2 and 3.

The cutting nozzles include supporting portions 53 rigidly carried by the supporting studs and the nozzles themselves indicated at 54 are supported in these portions 53 perpendicularly relative to the plate. Supply to these nozzles is through the tubes 55 entering the top of each axially thereof. Appropriate attachment nuts 56 hold the nozzles and tubing in place. The lower ends of the nozzles are turned in the proper direction for making the selected cuts along the edge of the plate.

Figure 2:
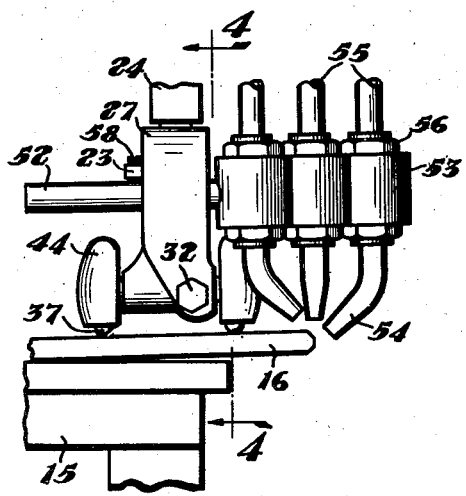
Figure 2 is a fragmentary enlarged view of the improved nozzle block and tracking mechanism showing a plate in position with the nozzles operating on the edge thereof, a condition of lateral plate deformation being indicated.
Figure 3:
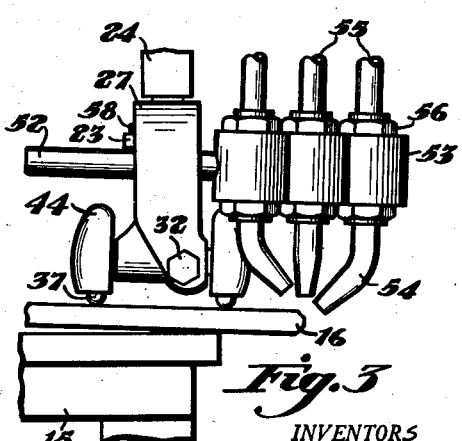
Figure 3 is a view taken similar to Figure 2 but showing the plate deflected from its normal plane in a direction opposite to that of Figure 2.
Figure 7:
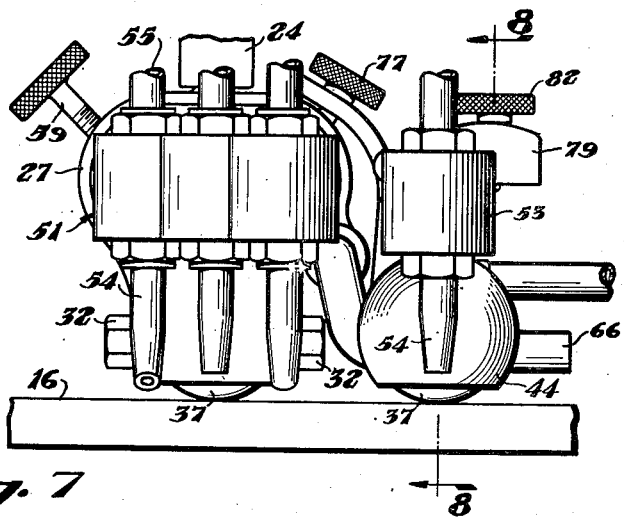
Figure 7 is a fragmentary view showing the preheating attachment in coupled relation for feed in advance of the cutting unit.

In the preparation of the edge of the plates illustrated, three cuts are made and these are referred to as the up-cut, the straight-cut and the down-cut, there being a nozzle appropriately angularly turned for each cut as illustrated in Figures 1 to 3 of the drawing. These cuts are made in the order named and Figure 6 illustrates the successive arrangement of the nozzles. This arrangement enables the nozzle mounting studs to be placed closer together.

The studs or rods 52 which mount the nozzles are fixed in position by means of set screws 58. Thus, the nozzles may be adjusted laterally relative to the plate edge by sliding the studs or supporting rods to the desired positions in the nozzle block thereupon setting the screws. For convenience the screws are located outside the confines of the swivel bracket or mounting for the nozzle block.

In order to prevent the nozzle block from tipping over within the swivel mounting when the device reaches the end of the plate and the wheels no longer have support, an abutment screw 59 is provided (Figure 4). This screw has a knurled head and is screwed through the curved portion of the swivel bracket, its inner end being adjustable relative to a flattened portion 60 of the swivel block. The abutment screw 59 is set so as not to interfere with the normal or required free movement of the nozzle block as lateral variations occur along the plate margin.

Thus, it will be apparent particularly from Figures 2 and 3 that the nozzle block and the nozzles as a unit will adjust to changes in the plane of the plate as these variations occur transversely of the edge being prepared. As previously stated, the vertically adjustable mounting of the entire unit in the bracket 22 permits direct vertical compensation for variations longitudinally of the edge. The relation which is maintained is that of the nozzle tips relative to the plate edge. This relation remains constant.

*Preheating attachment*

In Figures 7-10 inclusive, a preheating attachment is illustrated. This attachment is disposed in front of the main attachment carrying the cutting nozzles. The preheating attachment is used for cutting very heavy plates where an additional amount of heat is required to bring the metal up to cutting temperature. The preheating attachment includes the same principle of operation as the main or cutting nozzle attachment, that is to say, it is free to follow the contour of the metal when unevenness occurs and will accurately heat up the portion to be cut as the cutting nozzles follow behind.

Figure 10:
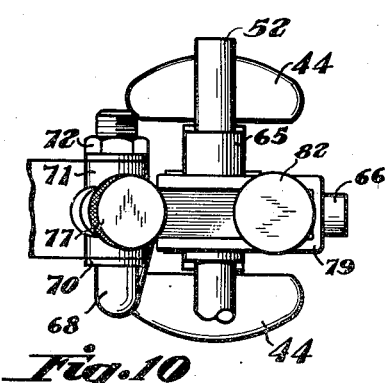
Figure 10 is a top plan view of Figure 9 further illustrating the preheating attachment.

The preheating device consists of a nozzle holder block or body 65. This block 65 is mounted for swiveling or pivotal movement on a bearing portion 66 of a coupling rod 67. The coupling rod 67 is bent upwardly and at right angles to the bearing portion 66 to provide a mounting portion 68 formed at the forward loop of the U-shaped swivel attachment 27. As shown in Figure 10, a shoulder 70 is provided on the mounting portion 68 engaging one end of the boss 71 formed integrally with the swivel element 27. The projected end of this mounting portion 68 is screwthreaded and a nut 72 is engaged thereon against a washer lying against the other end of the boss 71. Thus, the preheating unit is free to adjust vertically independently of the main cutting unit.

Figures 8, 9:
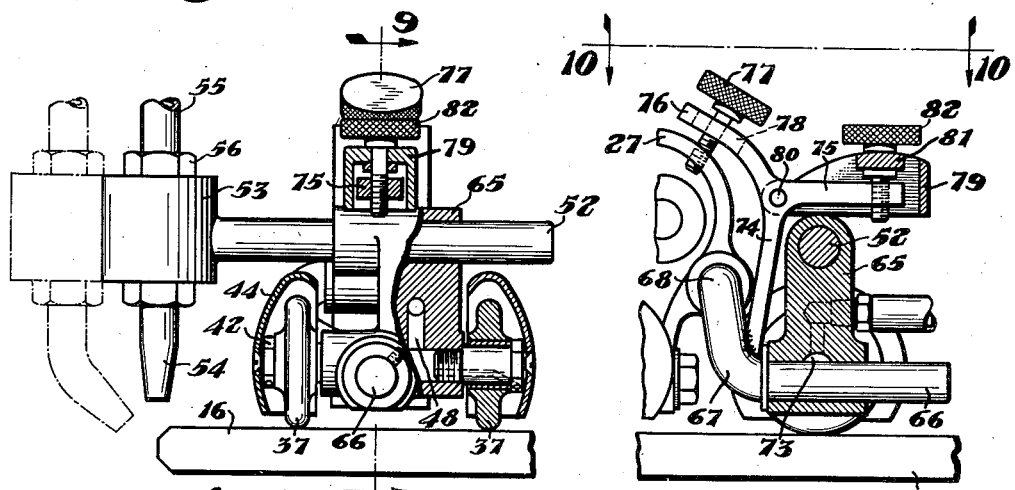
Figure 8 is a sectional view taken on line 8—8, Figure 7 illustrating the details of the preheating device assembly showing the mounting of the cutting nozzle therein.
Figure 9 is a sectional view taken on line 9—9, Figure 8 showing further details of the preheating unit.

Since the bearing portion 66 of this coupling is parallel with the axis of the swiveling axis, namely the screws 32, of the main cutting unit, the body 65 may rock in the same manner as the main unit to accommodate for lateral variations in the plate surface. The body 65 includes the same wheel mounting, air delivery arrangement and guard structure as the main unit, so that it is believed unnecessary to duplicate the description. The parts are indicated to correspond. Obviously, the axis of the wheels for the preheating unit is parallel with that of the wheels of the main cutting unit. There is one variation in structure and this is shown in Figures 8 and 9. Since the bearing portion 66 intersects the bore 39, it is placed slightly lower so that there is clearance for air flow over the top of the bearing portion 66 as indicated at 73.

In order to prevent the preheating attachment from tipping over or getting out of position when the end of the plate is reached, appropriate stop or limit members are provided. For this purpose an arm 74 is welded to the coupling rod and projects upwardly. It includes one extension 75 extended over the body 65 and another extension 76 projected adjacent to and generally parallel with the upper portion of the swivel member 27 of the main unit. An abutment screw 77 including a large knurled head is screwed into the element 27 traversing a slot 78 disposed along the extension. The abutment screw 77 is located so as to permit normal movements of the preheating attachment as permitted by movement of the extension 76 between the underside of the head of the screw 77 and the element 27. When the device runs off the end of the plate, the arm or extension merely engages the head and further displacement is impossible.

A U-shaped element 78 is mounted about the other extension 75 being pivoted on a pin 80 at the juncture of the extensions. The undersides of the arms of the U-shaped element are adapted to engage the top of the body. The U-shaped element includes a bridge member 81 lying above the extension and an adjustment screw 82 traverses this member 81 and is screwed into the extension. The screw is held for rotative but non-axial movement in the member 81. Thus, the position of the abutting lower edges of the U-shaped member relative to the body may be varied. It will be obvious that this member will prevent undue swiveling movement about the bearing member 66 if the wheels of the body are without support.

The preheat swiveling attachment is also used for very thin plates. In this event it is not used for preheating but actually carries the up-cut nozzle as shown in dot and dash lines in Figure 8. It is to be observed that in the thinner plates when the three nozzles are adjusted very closely to accomplish a double bevel excessive heat is generated and the metal plate melts instead of cutting off smoothly. Since the up-cut is the first cut made, it cuts through the most amount of metal and consequently requires a larger cutting nozzle. With the thinner plates there is not sufficient metal to dissipate this heat thus generated when the large nozzle is immediately followed by the straight and down-cut nozzles. By thus removing the large nozzle from the main cutting unit and placing it in the preheating unit in advance of the other two nozzles, the heat has a chance to dissipate sufficiently to allow the following nozzles to make clean cuts and not to melt the material at the edge of the plate.

Having described my invention, I claim:

1. In a device for trimming the edge of a metal plate the combination of; a carriage adapted to support a plurality of cutting torch nozzles in angular relationship to the edge of the plate and and to each other, said carriage having spaced co-axial wheels, a yoke having arms straddling said carriage, said carriage being mounted between the arms of said yoke for free swivelling movement about a horizontal axis transverse to the axis of said carriage wheels, and means for mounting said yoke for vertical floating movement relative to the plate, whereby variations in the plate surface adjacent to the edge and engaged by the wheels will be accommodated for as the carriage floats and swivels in accordance with the tracking contact of the wheels, the position of the nozzles remaining substantially the same relative to the edge of the plate as such variations occur.

2. In an apparatus for trimming the edge of a metal plate the combination of; a carriage having spaced co-axial wheels, a cutting torch nozzle fixed to said carriage, a mount for said carriage, means pivotally mounting said carriage on said mount for free swivelling movement about a horizontal axis transverse to the axis of said wheels, means for mounting said carriage mount for free vertical floating movement, and stop means for limiting the swivelling movement of said carriage, said means being adjustable into and out of the arc of movement of said carriage for selective limitation of the degree of carriage swivelling movement.

3. In an apparatus for trimming the edge of a metal plate, a carriage adapted to support a plurality of cutting torch nozzles, said carriage having spaced co-axial wheels for riding the plate, a translating mechanism for propelling said carriage in a predetermined path paralleling the plate edge, means for coupling said carriage to the translating apparatus for vertical floating movement to compensate for longitudinal variations in the plate surface engaged by the carriage, means for mounting said carriage in said coupling for free swivelling movement about a horizontal axis transverse to said wheel axis, a second carriage adapted to support a preheating torch in alignment with the torches supported by said first carriage, said second carriage having spaced co-axial wheels for riding the plate, a coupling connecting said second carriage to said first carriage in tandem tracking alignment therewith said second carriage being pivotally connected to said coupling for free transverse swivelling movement about a horizontal axis transverse to the wheel axis of said second carriage.

4. A preheating unit adapted for attachment to a plate tracking device comprising; a carriage having spaced co-axial wheels, a torch mounted on said carriage, a coupling adapted to connect said carriage to said plate tracking device in tandem tracking alignment therewith, said carriage being connected to said coupling for free transverse swivelling movement in response to lateral plate variations encountered by said wheels, and means for limiting the swivelling movement of the carriage relative to the plate tracking device.

5. In combination, a plate tracking device adapted to carry a cutting torch and having a transverse shaft bearing, a preheating unit adapted to be coupled in tandem tracking alignment with said device, said unit comprising a carriage adapted to support a preheating torch, said carriage having spaced co-axial wheels, a coupling for connecting said carriage in front of said plate tracking device, said coupling comprising a first shaft portion extending through said carriage transversely of the wheel axis thereof and a second shaft portion extending at right angles to said first shaft portion, said carriage being rotatably mounted on said first shaft portion for free transverse swivelling movement in response to transverse plate variations and said second shaft portion being journalled in the shaft bearing of said plate tracking device for free swivelling movement, whereby said carriage can float vertically in response to longitudinal plate variations encountered by said wheels.

6. A plate edge preparation device comprising, a carriage having spaced co-axial wheels, a yoke having depending arms adapted to straddle said carriage, said yoke being mounted for vertical floating movement, pivotal connections between said arms and the front and back portions of said carriage respectively whereby said carriage can swivel relative to said yoke, a support arm adjustably fixed in said carriage and extending laterally therefrom, and a cutting torch fixed to said support arm whereby said cutting torch will move responsively to the swivelling movement of said carriage.

HAROLD R. GETTYS.
RUSSELL P. KISSICK.

REFERENCES CITED

The following references are of record in the file of this patent:

UNITED STATES PATENTS

| Number | Name | Date |
|---|---|---|
| 1,578,917 | Pierce | Mar. 30, 1926 |
| 1,728,104 | Claude | Sept. 10, 1929 |
| 2,206,969 | McNutt | July 9, 1940 |
| 2,362,262 | French | Nov. 7, 1942 |
| 2,372,298 | Smith | Mar. 27, 1945 |
| 2,373,541 | Chelborg et al. | Apr. 10, 1945 |
| 2,429,686 | Helmkamp | Oct. 28, 1947 |
| 2,521,669 | Rountree | Sept. 5, 1950 |

FOREIGN PATENTS

| Number | Country | Date |
|---|---|---|
| 381,145 | Great Britain | Sept. 29, 1932 |
| 552,321 | Great Britain | Apr. 1, 1943 |